United States Patent [19]
Krempp et al.

[11] Patent Number: 5,211,841
[45] Date of Patent: May 18, 1993

[54] DEVICE FOR PRETREATING PLASTIC WASTE BEFORE RECYCLING

[75] Inventors: Olivier Krempp, Paris; Andre Renot, Franconville, both of France

[73] Assignees: Institut Francais du Petrole, Rueil-Malmaison; Lutz et Kempp Industries (L.K.I.), Athis-Mons, both of France

[21] Appl. No.: 659,677

[22] Filed: Feb. 25, 1991

[30] Foreign Application Priority Data

Feb. 23, 1990 [FR] France .................................. 90 02387

[51] Int. Cl.$^5$ ........................ B01D 17/12; B30B 15/26
[52] U.S. Cl. ...................................... 210/86; 100/43; 100/148; 100/150; 210/104; 210/143; 210/149; 210/167; 210/257.1; 210/258; 210/260; 210/403; 241/24; 241/33; 241/DIG. 38
[58] Field of Search .............. 100/43, 93 S, 126, 127, 100/145, 147, 148, 150; 241/20, 33, DIG. 38, 46 R, 46.02, 24; 210/167, 86, 104, 149, 248, 257.1, 258, 259, 260, 402, 403, 769

[56] References Cited

U.S. PATENT DOCUMENTS

| | | |
|---|---|---|
| 3,304,894 | 2/1967 | Cox et al. .................... 241/DIG. 38 |
| 4,000,031 | 12/1976 | Acobas ................... 241/20 |
| 4,160,722 | 7/1979 | Marsh .................... 241/20 |
| 4,379,525 | 4/1983 | Nowicki et al. ....................... 241/20 |
| 4,520,724 | 6/1985 | Costarelli ............................. 100/148 |
| 4,809,854 | 3/1989 | Tomaszek ........................... 241/20 |
| 5,060,870 | 10/1991 | Trezek et al. .............. 241/DIG. 38 |

FOREIGN PATENT DOCUMENTS

| | | | |
|---|---|---|---|
| 94282 | 11/1983 | European Pat. Off. ..... 241/DIG. 38 |
| 310947 | 4/1989 | European Pat. Off. ............ 100/127 |
| 693125 | 11/1930 | France ................................ 100/150 |
| 2573340 | 5/1986 | France ...................... 241/DIG. 38 |
| 93362 | 2/1959 | Norway ............................. 100/145 |
| WO8401125 | 3/1984 | PCT Int'l Appl. ................. 100/127 |
| 2159093 | 11/1985 | United Kingdom ............. 100/93 S |
| 2191118 | 12/1987 | United Kingdom .................. 241/20 |
| 2198662 | 6/1988 | United Kingdom .................. 241/24 |

*Primary Examiner*—Joseph W. Drodge
*Attorney, Agent, or Firm*—Antonelli, Terry, Stout & Kraus

[57] ABSTRACT

A pretreating plastic waste device including a tank containing a liquid to which the plastic waste is introduced, a washing pump, a dripping drum, and a dewatering device comprising a press-screw adapted for separating the washed waste from the washing liquid and a drying drum fed by a hot air blower, and a filtration vat. A programmable controller receiving signals from various level and temperature sensors and various working parameters allows total control, at all stages, of the waste pretreatment cycle. The programmable controller is associated with a screen for displaying error messages and a control desk for allowing direct selective intervention at the level of the concerned elements.

12 Claims, 5 Drawing Sheets

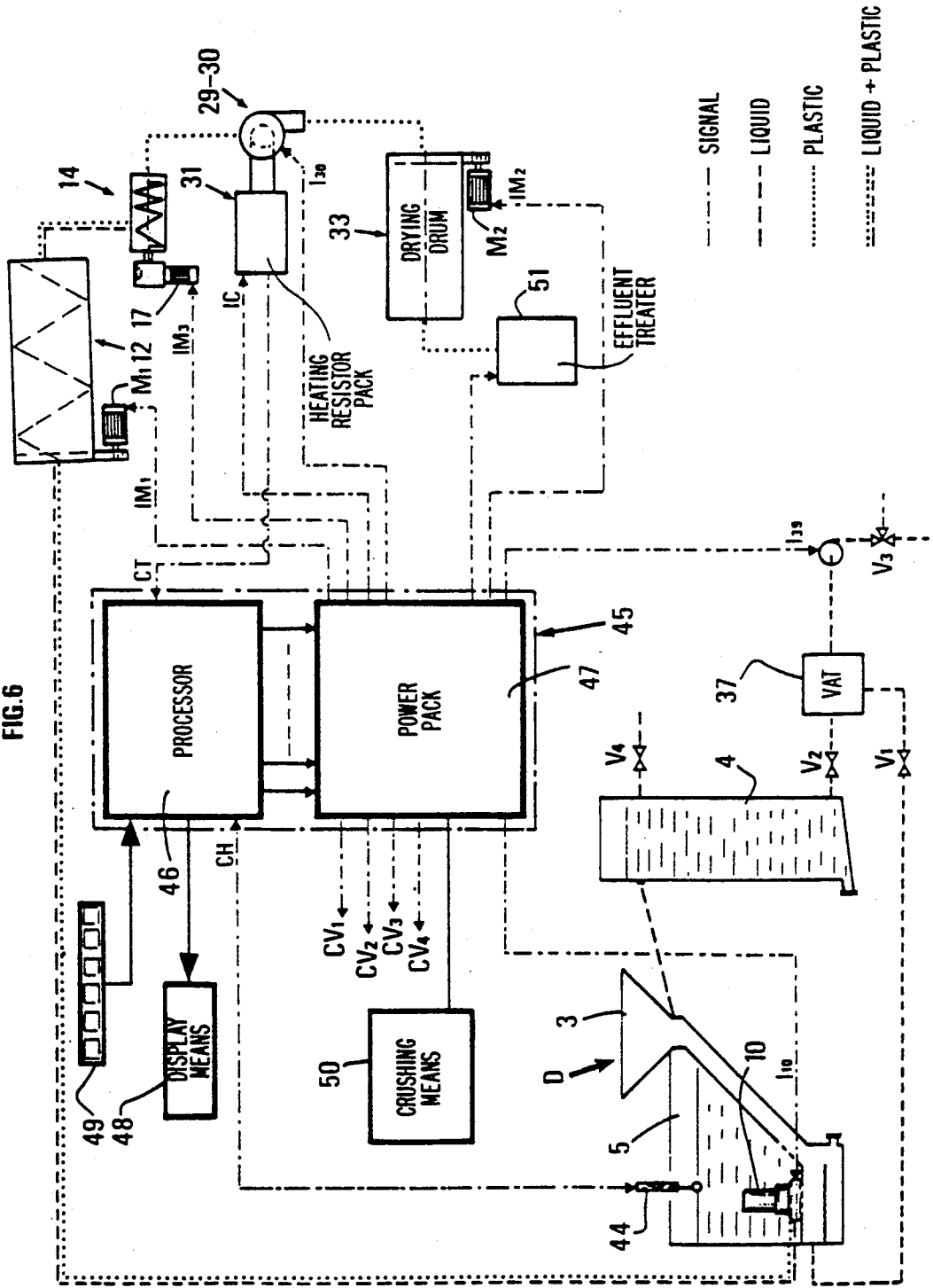

DEVICE FOR PRETREATING PLASTIC WASTE BEFORE RECYCLING

BACKGROUND OF THE INVENTION:

The present invention relates to a device for pretreating plastic waste before recycling and, more particularly, to a device for separating, from plastic waste, other substances or matters which the waste may be mixed with and for delivering this waste washed and dried.

Much plastic waste of industrial, agricultural or domestic origin is often mixed with other solid materials, dirtied by contacting other various substances or else covered with depositions, and coatings to be recovered or at least partly removed.

This is the case for numerous plastic objects or films which have been used for conditioning, packaging or protecting of products, that is, films, polyethylene or PVC vessels. It is, for example, also the case for photofilms or X-ray plates the sensitive depositions which are to be recycled. It is also the case, for example, with films covered or coated with other substances that are to be at least partially removed before their treatment.

The possible reuse of this waste or its recycling first requires a pretreatment comprising a crushing or severance and a total or partial separation of the foreign products or substances through washing and drying, in order to obtain recyclable waste.

Devices capable of treating plastic waste are described in published European patent applications 94,282 or 310,947 as well as in published French patent applications 2,573,340 or 2,599,279.

Treating plastic waste is often achieved in extensive plants including numerous functional subsets which must be installed in a permanent manner, which often implies a centralization of the waste to be treated, and which requires a trained operator. The cost and the cost-in-use of such plants are generally very high. These types of plants, in view of size and of operating costs, are not suitable for many applications.

Very often, the problem to be solved for the treatment of plastic waste consists in obtaining a reliable device that can reach a high treatment rate and which is economically profitable; works with an amount of washing liquid with a low renewal rate in order to avoid pollution problems or to facilitate the possible recovery of certain substances separated by the washing; is sufficiently compact to be able to be easily transported to waste accumulation spots; and is equipped with controls that are sufficiently elaborated to enable operation without difficulty and to be used, preferably, by a non-specialized operator.

SUMMARY OF THE INVENTION

The device according to the invention enables achievement of the treatment of plastic waste under conditions of costs, mobility and implementing easiness that are essential for numerous applications.

In accordance with the present invention, a tank is provided which is filled with a liquid into which the plastic waste to be treated is introduced, with a pumping means being provided which includes a washing pump. A separating system communicates with the washing pump, in order to separate the liquid from the washed waste, with the separating system including a dripping drum. Means are provided for compressive dewatering comprising a rotatable press-screw arranged along an accumulation channel with a substantially constant cross-section, and at least one part for braking the waste, which is engaged in the accumulation channel through a radial opening arranged in the wall of the latter. The braking part is associated with an adjustable elastic means for exerting on the braking part a force regulated to vary the cross-section of the waste passageway in the accumulation channel and to adjust the compression stress exerted on the waste.

The device may also advantageously comprise dividing means for disintegrating or crumbling the waste coming from the dewatering means.

The dividing means comprises, for example, at least one knife that is immovably attached to the rotatable press-screw.

The press-screw may have a variable pitch, with the pitch being larger on the screw inlet side than toward the moving braking parts.

According to one embodiment of the invention, the device also comprises pneumatic drying means recovering the waste coming from the dividing means.

According to another embodiment of the invention, the device comprises a vessel containing a liquid, means for introducing the waste into the tank comprising a loading hopper, a duct communicating with the base of the tank, and a communication channel arranged between the vessel and the hopper for allowing a carrying of the plastic waste by the liquid.

Receivers can be utilized to canalize the liquid coming out of the separating system.

According to the present invention, the accumulation channel is fitted with salient elements arranged parallel to its axis in order to prevent a rotation of the accumulated waste.

When the dividing of the plastic waste is insufficient, the device may comprise a plastic waste precrushing set, and means for linking the set to the tank filled with liquid.

The device may also comprise means for treating the liquid in order to separate, from the liquid, the substances removed from the plastic waste by washing and pumping means for recycling the liquid coming from the treating means.

The device according to the invention advantageously comprises a programmed control set to drive and control the treating process, with the control set comprising a treating processor, an electric power pack for supplying electric power to the pumping means, the dripping means, and the dewatering means, and with the treating processor being connected to a means for detecting the liquid level, to a temperature sensor associated with the dewatering means and to condition the sensors for detecting the working parameters of various components of the device.

Since the device can be presented in the form of one single piece that is relatively compact, it can be easily transported to an operation site. The use of dewatering means with a press-screw and of dividing means allows the device to deliver almost dry waste and to thereby save considerable energy in the drying phase. The control set is adapted to pilot the different working and control sequences in relation with condition or measuring sensors, so that the operation of the device according to the invention is substantially automated.

BRIEF DESCRIPTION OF THE DRAWINGS

Other features and advantages of the device according to the invention will be clear from reading the description hereafter of an embodiment, given by way of a non-limitative example, with reference to the accompanying drawings, wherein:

FIG. 6 is a schematic diagram of the operation of the device of the present invention.

DESCRIPTION OF THE PREFERRED EMBODIMENTS

Figure 1:
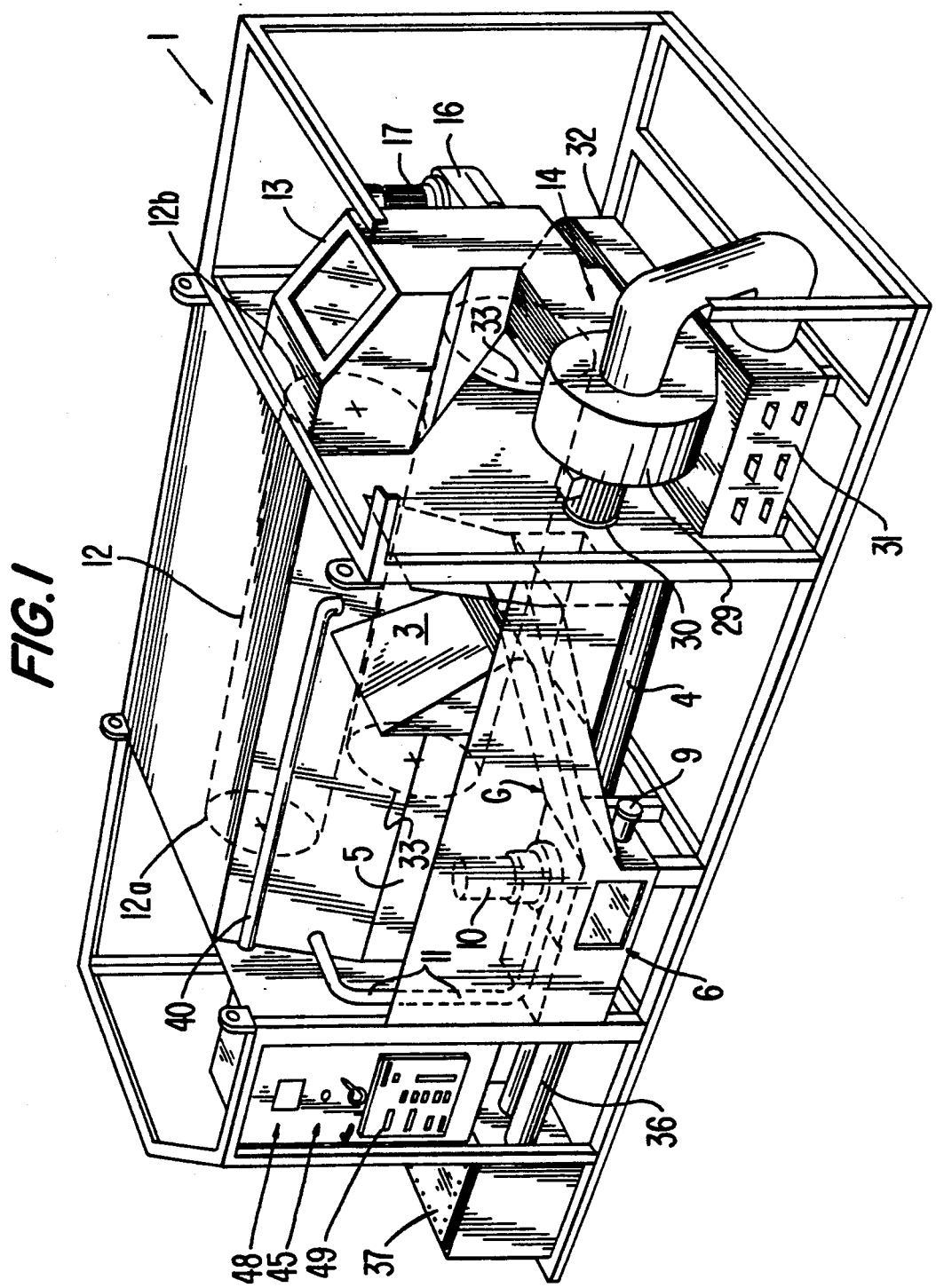
FIG. 1 is a schematic perspective view of the device of the present invention.
Figure 2:
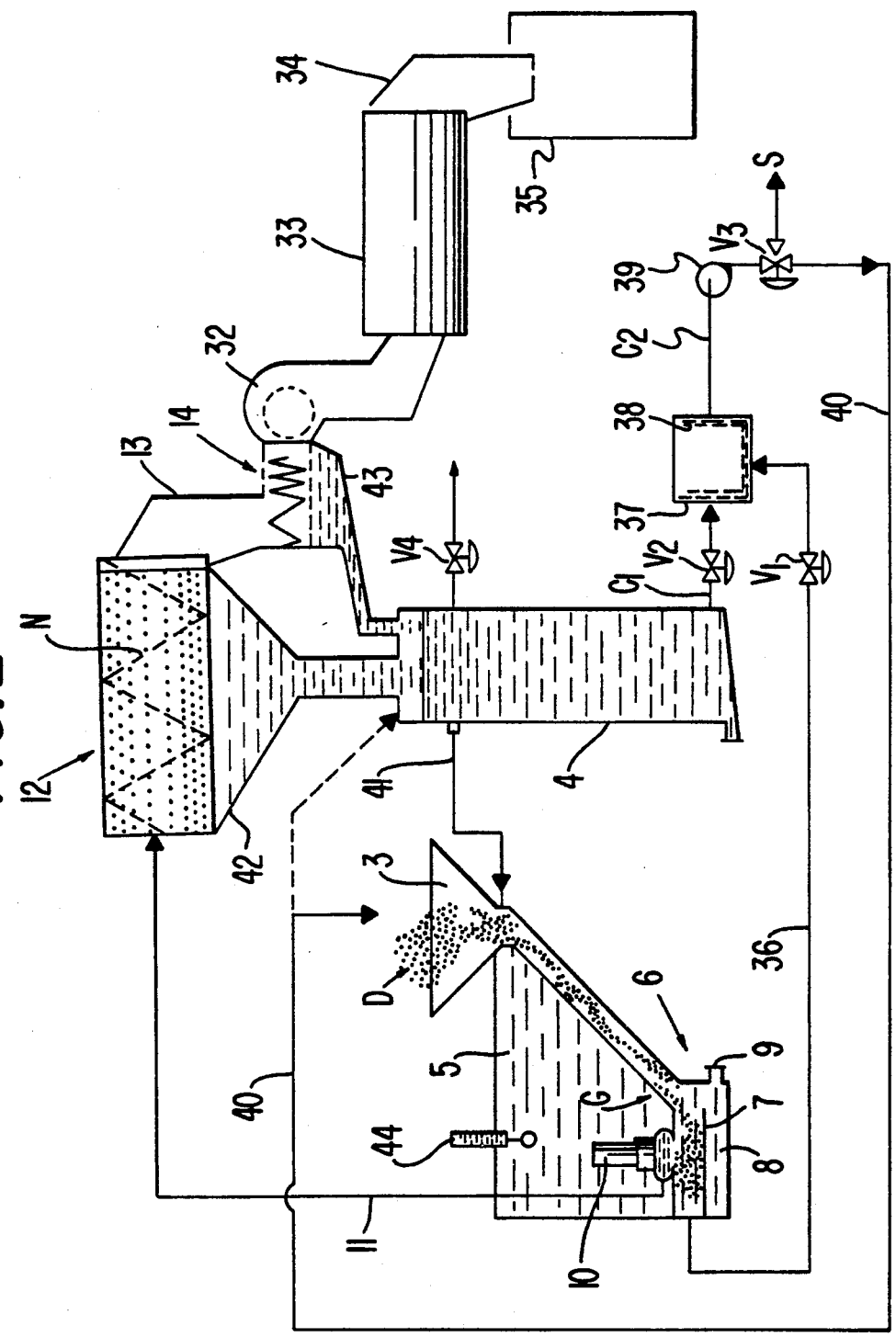
FIG. 2 is a schematic view of the circulation of the waste and of the liquid in the various elements of the device.

The device is, for example, as shown in FIGS. 1 and 2, in the form of one single structure delimited by a rigid cage, with fastening loops 2 being immovably attached to the cage to allow a displacement of the device or to transport the device towards a place of accumulation of plastic waste to be treated.

Figure 3:
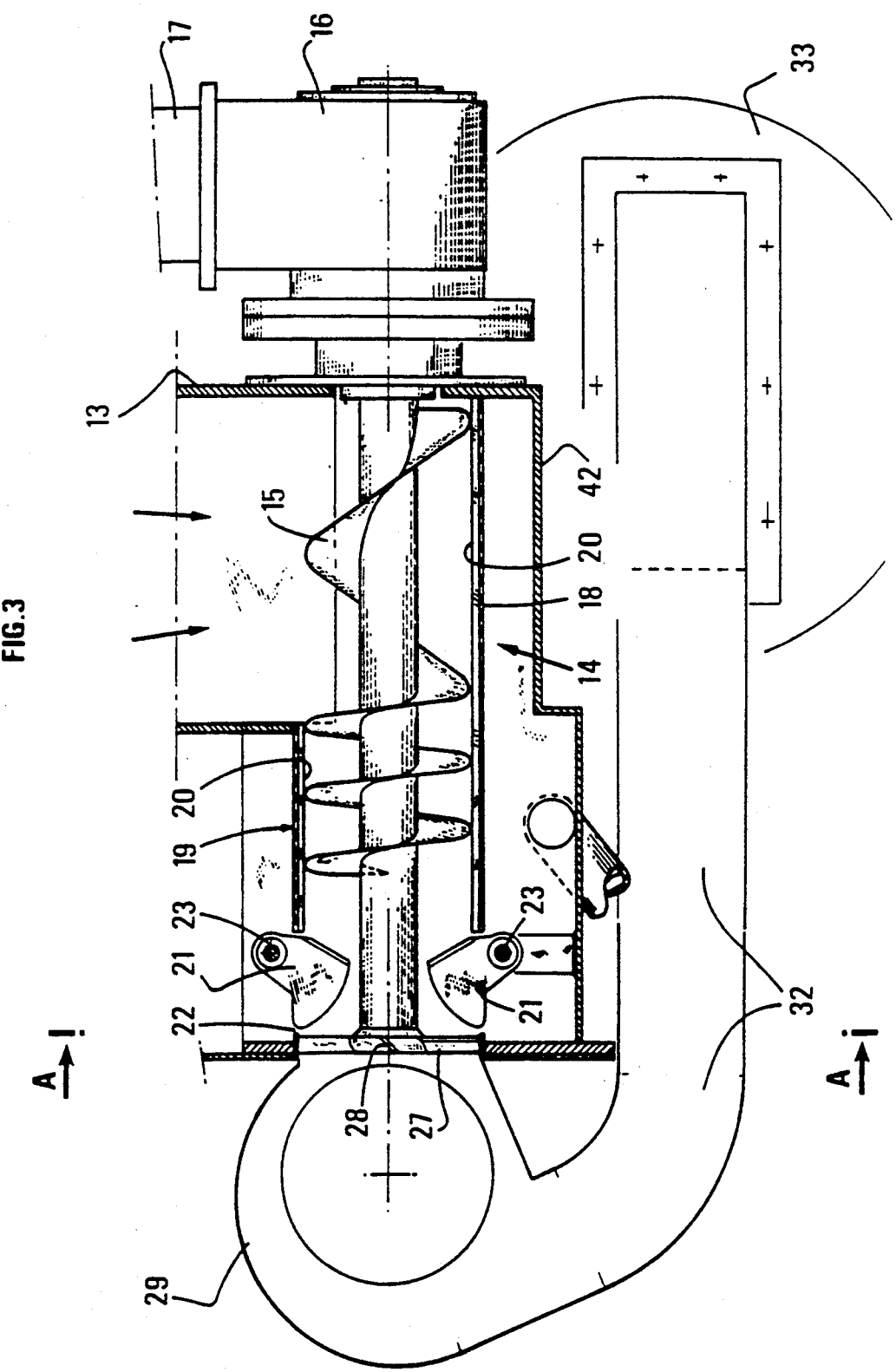
FIG. 3 is a partial cross-sectional view of the dewatering means with the press-screw and the moving braking parts.

The waste D to be treated is introduced into an inlet hopper 3. A water current coming from a vessel 4 (FIG. 2) drives the water and waste toward the bottom of a buffer tank 5 containing water. In a lower part 6 of the buffer tank 5, a plate 7 delimits a space 8 where the heavy particles which may be mixed with the plastic waste fall. Discharging these particles can be performed during the interruptions in the treating cycles through a lateral opening 9. A washing pump 10 is immersed in the tank, with a suction opening extending downwardly. The shaking caused in the lower part 6 by the suction of the washing pump 10 has the effect of separating the plastic waste from the stains or various substances which are mixed with the waste. The waste suctioned by the washing pump 10 is driven back through a piping 11 up to a first end 12a of a dripping drum 12 fitted with ports over an entire peripheral surface thereof. The drum 12 is rotated by a motor M1 (FIG. 6). A helical rib N may be fastened onto the inner wall of the drum 12 in order to facilitate the driving of the dripped plastic waste towards its opposite end 12b. The dripped waste, discharged from the drum 12 at end 12b, is passed through an inlet duct 13 towards a watering means shown in FIG. 3.

Figure 5:
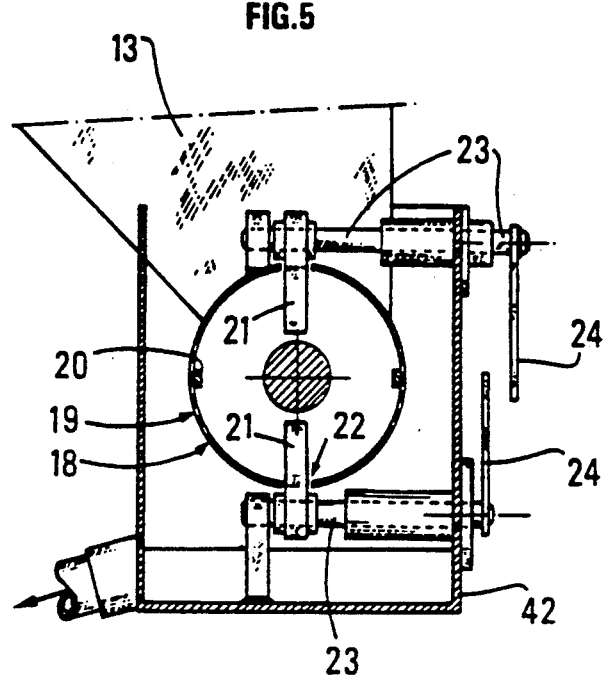
FIG. 5 is a partial cross-sectional view of an accumulation channel of the dewatering means with the antirotation salient elements.
Figure 4:
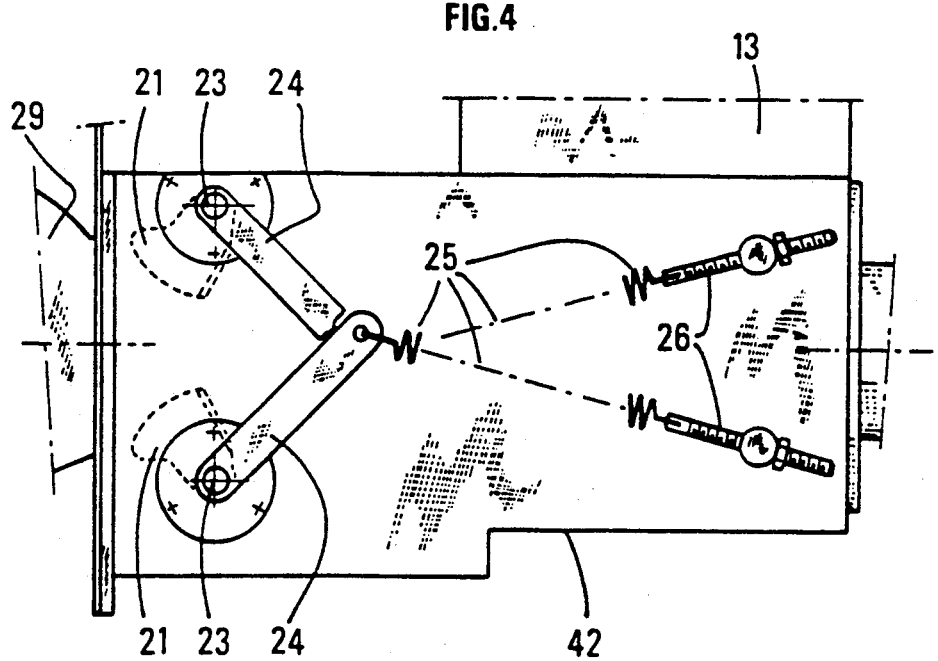
FIG. 4 is a schematic view of the spring means associated with the moving parts.

The dewatering means 14 comprise a press-screw 15 immovably attached to a first end of the outlet axis of a geared motor 16 rotatably driven by an electric motor 17 (FIG. 1). The press-screw 15 rotates in a collector housing 18 linked to the inlet duct 13. The press-screw 15 has a variable pitch that is larger on the side of the first end, where the duct 13 bringing along the dripped waste. Toward its opposite end where the pitch is smaller, the press-screw 15 is engaged into an accumulation channel 19 extending housing 18 and whose cross-section is close to that of the press-screw 15. The peripheral wall of the accumulation channel 19 is fitted with perforations for allowing a discharge of the liquid driven away by the press-screw 15. Bars 20 (FIGS. 3, 5) are fastened to the walls of the housing 18 and of the accumulation channel 19 in parallel to the axis of rotation of the press-screw 15, in order to prevent the plastic waste from rotating with the press-screw 15 thereby improving the effect of compression caused by the rotation of the press-screw 15.

The dewatering means 14 also comprise at least one braking part 21 which partly obstructs the progression of the waste in the accumulation channel 19. Each braking part 21 can be movable. Two braking parts 21 consisting of two cams which can enter the accumulation channel through radial openings 22 arranged in its lateral wall are, for example, utilized. The two braking parts 21 are pivoted cams. The braking parts 21 are immovably attached in rotation to two axes 23. Springs 25 are provided, with an end of the respective springs 25 being respectively arranged on an arm 24 for exerting a force on each of the braking parts 21 tending to tip the respective braking parts 21 up towards the inside of the accumulation channel 19, thereby hindering the progression of the plastic waste. Adjusting means 26 are associated with each of the springs 25 for enabling an adjustment of the intensity of the braking torque exerted on the braking parts 21. At the very beginning of the treating cycle, when the accumulation channel 19 is empty, the cams of the braking parts 21 are engaged at the maximum, which facilitates the initial forming in the channel 19 of a waste plug and increases the compression stress exerted by the press-screw 15. The use of adjustable springs 25, 26 enables an automatic regulation of the braking force applied by the braking parts 21. A constant dewatering quality is obtained thereby, and the risks of failure due to a total obstruction of the accumulation channel 19 are avoided.

The device also comprises dividing means for disintegrating or crumbling the compressed waste exiting the accumulation channel 19. These dividing means comprise, for example, a brace 27 fastened at the end of the axis of the press-screw 15. Brace 27 carries several knives 28 inclined with respect to the direction of forward movement of the compressed waste. While rotating, the knives 28 divide the plug exiting the accumulation channel 19.

The device also comprises pneumatic means for perfecting the dewatering of the waste. These means comprise a blower 29 rotatable by an electric motor 30, with the blower suctioning air heated by heating means such as a battery of electric resistors 31. The outlet of the blower 29 is connected to a sheath 32 in which the outlet of the accumulation channel comes out. The disintegrated waste is blown through the sheath 32 towards a first end of a drying drum 33 rotatable by a motor M2 (FIG. 6). The perfectly dried waste is gathered at the outlet of the drying drum 33 at its opposite end. A hopper 34 (FIG. 2) may be installed between the outlet of the drying drum 33 and a collection vat 35.

At the other end of the circuit, the inlet hopper 3 may, for example, be fed by an assembly conveyor (not shown). When the size of the plastic waste to be treated is too large, plastic waste is run through a conventional pre-crusher 50 (FIG. 6) arranged upstream from the device.

It can be seen on the circulation diagram of FIG. 2, that the lower part of the buffer tank 5 is connected through a piping 36 (FIG. 1) and by a solenoid valve V1 to a filtering and decanting vat 37, with a filter 38 for filtering and the vat 37 decantering effluents separated from the plastic waste through the stirring of pump 10. It can also be seen that the vat 37 communicates with the vessel 4, through a pipe C1 fitted with a control solenoid valve V2, and with a lifting pump 39 through a pipe C2. A pipe 40, fitted with a solenoid valve V3 (FIG. 1), controls the communication between the lifting pump 39 and the inlet hopper 3.

The filtering and decanting vent 37 can be replaced by any other liquid treating device which is best adapted for separating certain specific substances from the liquid to be recovered.

Additionally, as shown in dashed lines in FIG. 2, pipe 40 may communicate the lifting pump 39 directly with the vessel 4. The liquid in the vessel 4, which is used for driving the waste discharged into the inlet hopper 3, reaches the latter through a channel 41. Receptacles 42, 43 are respectively arranged under the dripping drum 12 and the housing of the press-screw 15. The collected liquid is directed towards the vessel 4.

The liquid necessary to fill the circuits of the device or to complete their filling is allowed to pass by operation of a solenoid valve V4 connected with an outside source (not shown).

A grate G links the buffer tank 5 with the ramp coming down from the inlet hopper 3. The volume of liquid contained in the tank 5 serves as a buffer volume in order to avoid a failure of the washing pump 10 because of an insufficient flow rate of water coming from the ramp.

The device also comprises means for regulating the volume of liquid in circulation, which means are operable in dependence upon data supplied by a level indicator or sensor 44 (FIG. 6). The indicator 44 is preferably arranged in the buffer tank 5, rather than in the vessel 4 with a larger volume, because the level changes are faster there and can therefore be taken into account more easily. Level indicator 44 can nevertheless be arranged in any other location of the liquid circuits.

The total amount of liquid used is relatively low, which is notably favorable in cases where certain substances which are mixed with the liquid and which have been removed from the plastic waste through washing have to be recovered.

The control set which is diagrammatically shown in FIG. 6 comprises a programmable control means 45 consisting of a treating processor 46 associated with display means 48 and a control desk 49 fitted with keys, and an electric power pack 47. The treating processor 46 receives the measuring signals CH from the level indicator or sensor 44 in the buffer tank 5 and the measuring signals CT produced by a temperature probe in the heating means 31.

The programmable control means 45 is also linked with condition sensors arranged in various locations of the device in order to detect working anomalies.

The condition sensors may, for example, include isothermal capsules on the various motors for detecting overheating of the motors, thermal relays for protecting the various motors in case of an overcurrent, a clogging sensor for sensing an abnormal accumulation of plastic waste in the inlet hopper 3, and one or more sensors for sensing an opening of solenoid valves or operators, safeguarding equipment normally closed during operation of the device.

Processor 46 elaborates control signals while respecting a pre-established programming and while taking into account the various condition signals which are transmitted to it and controls the power pack 47 accordingly. The processor 46 transmits to the display means 48 messages reporting operational anomalies. The operator can then take and act on the subset concerned by the anomaly by a control desk 49, in order to restore a normal operation and then to give the control of the process back to the control means 45.

The power pack 47 is connected to the electric motors of the pumps and the drums and to the means controlling the solenoid valves and generates signals CV1, CV2, CV3 and CV4 for the solenoid valves V1–V4, currents IM1, IM2, and IM3 respectively allowing a driving of the dripping drum 12, drying drum 33 and press-screw 15, currents I10, I30 and I39 for driving pumps 10, 39 and blower 30, and the current feeding the heating resistors 31.

Power pack 47 also comprises outlets for secondary feedings where equipment arranged upstream of downstream from the device in the process for treating plastic waste can be connected. Upstream, the crushing means 50 (FIG. 6) can be used in order to reduce, if necessary, the size of the waste to be pretreated. The device can be completed downstream with means 51 for treating the effluents separated from the waste by the washing cycle or through a separation performed by the device.

The working cycle controlled by the control means 45 comprises the following successive stages:

1. Starting necessarily comprising, in order:

1.1. An initialization phase with a possible checking and leveling of the liquid in the circuit, as well as the starting of the heating means, i.e., resistors 31, until a determined working temperature is obtained and, once this phase is completed, 1.2. Subsequent and sequential activation of:
a) the blower 29,
b) the drying drum 33,
c) the dewatering means 14,
d) the dripping drum 12,
e) the circulating pump 10,
f) the means for loading the waste to be treated into the inlet hopper 3, (possibly such as an assembly conveyor),
g) possible pre-crushing means arranged upstream of the device, and
h) possible means for treating the effluent separated from the plastic waste by washing.

2. During the cycle, the control means 45:

2.1. controls a heating regulation loop through the heating resistors 31 according to the signals CT produced by the temperature probe;

2.2. controls a loop regulating the amount of liquid in the circuits from the signal supplied by the level indicator 44 in the tank 5 through action of the valve V4;

2.3. controls the electric power used by the motors and the heating resistors 31; and 2.4. controls the proper working of the equipment according to the signals that are delivered by the condition sensors mentioned above. The control means 45 particularly controls the exceeding of threshold values and the duration of the possible exceedings.

The controls are performed continuously. According to the possible anomaly that is noted, the device is stopped and an error message is displayed on the display screen 48.

3. Stopping stage 3.1. In the case of a production stop, the various elements are stopped in reverse order in relation to their starting (see phase 1.2).

3.2. In case of a full stopping, which can only happen after the phase of production stop, the heating means and the means for regulating the level of liquid are stopped.

3.3. In case of an emergency stop, all the elements of the device are immediately stopped.

4. Test mode running

Following this mode, the operator can separately control each element of the device by a control desk 49, with the control means 45 keeping the management of the working safety devices.

The embodiment which has been described above comprises a dripping drum to remove the mots part of the washing water. The scope of the invention would nevertheless not be overstepped by eliminating this dripping drum and replacing the press-screw described above by an oblong model which can fulfill, at the same time, the dripping and the dewatering functions.

Neither would the scope of the invention be overstepped by using a press-screw with a constant pitch instead of a screw with a variable pitch of the described embodiment. . . .

Neither would the scope of the invention be overstepped by replacing the water circulating in the device by any washing liquid or by adding to the water particular additives, for example, detergents or antifoamers.

In the same way, the scope of the invention would not be overstepped by replacing the hot air dewatering means by means delivering dry air.

We claim:

1. A device for pretreating plastic waste adapted to deliver washed and dried plastic waste for recycling, the device comprising:

a tank filled with liquid into which the plastic waste to be treated is introduced, means including a washing pump for washing the plastic waste with liquid, a separating system communicating with the washing means arranged for separating the washed plastic waste from the liquid of said washing pump, said separating system including a dripping drum, and means for compressively dewatering the separated washed plastic waste comprising an accumulation channel with a substantially constant passageway including a cylindrical wall, a press-screw arranged along a portion of said accumulation channel, at least one radial opening arranged in the cylindrical wall of the accumulation channel, at least one braking part pivotably mounted with respect to said accumulator channel for radially engaging in said at least one radial opening so as to be displaceable from a first position away from the press-screw and a second position near said press-screw, and elastic means connected with said at least one braking part for continuously exerting thereon an elastic force for moving said at least one braking part into said second position and restricting said passageway, whereby an elastic braking force is continuously exerted on the washed plastic waste in said accumulation channel.

2. A device as claimed in claim 1, further comprising dividing means for disintegrating the plastic waste from the means for compressively dewatering.

3. A device as claimed in claim 2, wherein said means for disintegrating comprise at least one knife fixedly attached to the press-screw so as to be rotatable therewith.

4. A device as claimed in one of claims 2 or 3, further comprising pneumatic drying means for drying plastic waste supplied from the dividing means.

5. A device as claimed in one of claims 1, 2 or 3, further comprising a vessel containing a liquid and means for introducing the plastic waste into the tank including a loading hopper, a duct communicating with a bottom of the tank, and a communication channel arranged between the vessel and the hopper for allowing a driving of the plastic waste by the liquid from said vessel.

6. A device as claimed in claim 5 further comprising receptacles arranged below said dripping drum for canalizing liquid from the separating system.

7. A device as claimed in one of claims 1, 2 or 3, further comprising control means for driving and controlling the device so as to enable an automated pretreating of the plastic waste.

8. A device as claimed in claim 7, wherein the control means comprising a signal processor, an electric power pack for supplying electric power to the washing pump, the dripping drum and the means for compressively dewatering, and wherein the signal processor is connected with a means for detecting a level of the liquid in the tank, a temperature sensor associated with the means for compressively dewatering and sensor means for detecting working parameters of the device.

9. A device as claimed in one of claims 1 or 2, wherein the press-screw includes an inlet side, and outlet side and has a variable pitch, and wherein the variable pitch is larger on the inlet side than the outlet side thereof.

10. A device as claimed in one of claims 1 or 2, wherein the accumulation channel includes means arranged parallel to a longitudinal axis of the accumulation channel for preventing a rotating of accumulated plastic waste.

11. A device as claimed in claim 1, further comprising means for pre-crushing the plastic waste, and means for linking said means for pre-crushing with the tank filled with liquid.

12. A device as claimed in claim 1, further comprising a means for treating the liquid to separate liquid removed from the plastic waste to enable a recycling of the liquid.

* * * * *